Dec. 27, 1927.
E. J. SCHNABL
MILKING PAIL HOLDER
Filed June 2, 1927
1,653,972
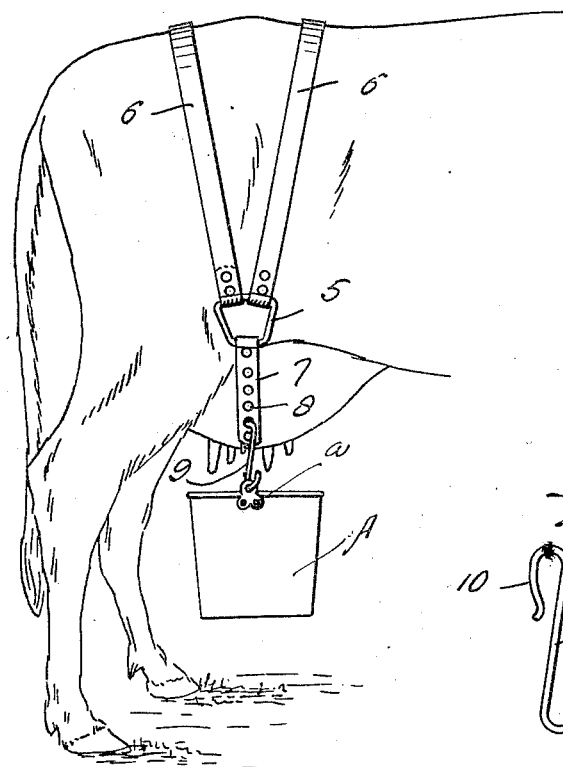
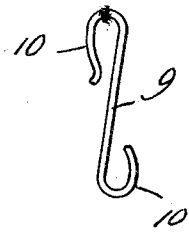
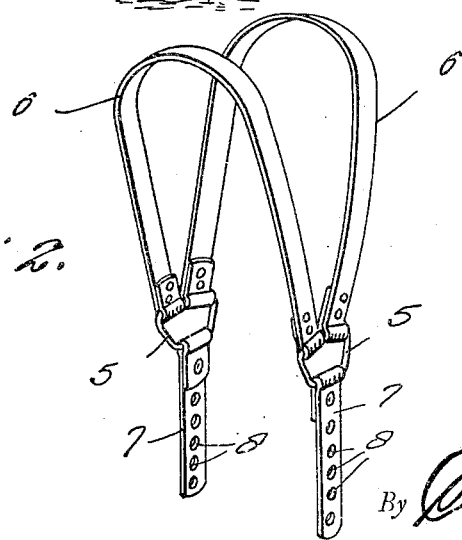
Inventor
E. J. Schnabl
By Clarence A. O'Brien
Attorney Patented Dec. 27, 1927.

1,653,972

UNITED STATES PATENT OFFICE.

EMIL JOE SCHNABL, OF AMBERG, WISCONSIN.

MILKING-PAIL HOLDER.

Application filed June 2, 1927. Serial No. 196,073.

This invention relates to new and useful improvements in milking pail holders and aims to provide a highly novel, simple and inexpensive device constructed for engagement over the back of a cow to facilitate the hanging of a milking pail beneath the udder thereof with the obvious result that the milk may be projected directly into the pail and wherein there will be absolutely no liability whatever of the pail being knocked over inasmuch as the same is actually secured to the cow during the milking thereof.

In carrying out my invention there is provided a simple harness structure the ends of which are constructed for receiving hooks or other fasteners to which the usual bail attaching ears of a milk pail may be secured, it being necessary first however that the bail be removed from said ear.

In the drawing wherein like reference characters indicate corresponding parts throughout the several views:

Figure 1 is a side elevation of the rear body portion of a cow to which is applied my milking pail holder shown as supporting a milking pail directly beneath the cow's udder.

Figure 2 is a perspective of the harness structure of the holder, and

Figure 3 is a side elevation of one character of hook that may be provided for suspending the milking pail from the harness.

Now having particular reference to the drawing, my novel milking pail holder consists of a pair of relatively triangular shaped wire rings 5—5, the upper portions of which are bent slightly downwardly at opposite sides of their centers, and to which downwardly bent portions are attached the opposite ends of a pair of straps 6—6 which will assume the separated condition as indicated in Figures 1 and 2 by reason of the shape of the upper portions of said rings 5—5. Attached to the lower portions of these rings are depending straps 7—7 that are formed throughout their length with spaced openings 8. Obviously the straps 6—6 are adapted for disposition over the back of the animal above the udder thereof as indicated in Figure 1, the length thereof and of the straps 7—7 being such that the lower ends of the straps will at least reach the bottom of the udder.

The invention further includes a pair of hooks or other fastening means for the milking pail A, such hooks being preferably of the character indicated in Figure 3, and designated by the reference character 9. This type of hook consists of a single length of wire bent inwardly upon itself at its opposite ends to provide hooks 10—10, one of which is for engagement within any predetermined one of the openings in the strap 7, while the other is adapted for engagement within the opening of the usual ear $a$ at the upper edge of the pail A, these ears being usually for the purpose of receiving the opposite ends of a carrying bail.

It will thus be seen that the pail A may be suspended directly beneath the cow's udder and supported at a predetermined spaced relation with respect thereto, and by reason of the attachment of the pail directly to the animal's body there will be absolutely no liability of the same being kicked over by the animal or the milker.

Having thus described the invention, what I claim as new is:—

1. In a milking pail holder of the character described, a pair of relatively triangular rings, a pair of straps loosely connected at their ends to said triangular rings for engagement over the animal's back, short straps loosely secured at their inner ends to the rings at points between the sides thereof, and beneath the point to which said first mentioned straps are secured, and means whereby a milk pail may be suspended from said last mentioned straps.

2. In a milking pail holder of the character described, a pair of relatively triangular rings, a pair of straps loosely connected at their ends to said triangular rings for engagement over the animal's back, short straps loosely secured at their inner ends to the rings at points between the sides thereof, and beneath the point to which said first mentioned straps are secured, means whereby a milk pail may be suspended from said last mentioned straps, said means consisting of openings in the straps, and a pair of members for engagement at certain ends within predetermined ones of the openings and at their opposite ends for attachment to the pail.

In testimony whereof I affix my signature.

EMIL JOE SCHNABL.